(12) United States Patent
Spreitzer

(10) Patent No.: US 6,254,192 B1
(45) Date of Patent: Jul. 3, 2001

(54) DUMP TRAILER

(76) Inventor: Henry Spreitzer, 33339 Bloomberg Rd., Eugene, OR (US) 97405

( * ) Notice: Subject to any disclaimer, the term of this patent is extended or adjusted under 35 U.S.C. 154(b) by 0 days.

(21) Appl. No.: 09/635,393

(22) Filed: Aug. 8, 2000

(51) Int. Cl.[7] .................................................. B60P 1/16
(52) U.S. Cl. ................................. 298/22 R; 298/19 R
(58) Field of Search .......................... 298/22 R, 19 R, 298/19 V, 22 F, 21 V; 254/93 R, 93 HP

(56) References Cited

U.S. PATENT DOCUMENTS

| | | | |
|---|---|---|---|
| 3,659,899 | * | 5/1972 | Phillips et al. ................. 298/22 R |
| 3,784,255 | * | 1/1974 | Smock ........................... 298/8 T |
| 4,145,085 | | 3/1979 | Taber et al. . |
| 4,572,579 | * | 2/1986 | Saito ........................... 298/22 R X |
| 4,968,210 | | 11/1990 | Friedrich . |
| 5,067,774 | * | 11/1991 | Trowland ........................ 298/1 A |
| 5,560,684 | * | 10/1996 | Gilmore ......................... 298/22 R |
| 5,975,643 | * | 11/1999 | Smith et al. ................... 298/22 R |

* cited by examiner

*Primary Examiner*—Stephen T. Gordon
(74) *Attorney, Agent, or Firm*—Robert E. Howard

(57) ABSTRACT

A dump trailer having a bed pivotally attached at its rear end to a trailer frame. The trailer bed is raised and lowered by use of an air bag assembly attached at one end to the trailer frame and attached at the other end to the trailer bed. The trailer has a frame formed of hollow frame members which form a reservoir for holding compressed air. Conduit and valve means communicate the compressed air in the hollow frame members with the air bag assembly for inflation to thereby raise the trailer bed. The valve permits air to be exhausted from the air bag assembly to lower the trailer bed. An air compressor operated from the rotation of one of the trailer tires during movement of the trailer provides compressed air to the hollow frame members.

3 Claims, 3 Drawing Sheets

DUMP TRAILER

BACKGROUND OF THE INVENTION

This invention relates to a dump trailer having a bed raising mechanism.

It is known to provide large trailers and trucks with mechanisms for raising or tilting the bed in order to dump the contents contained therein. Such mechanisms are typically hydraulically operated and are expensive and complex.

SUMMARY OF THE INVENTION

It is an object of the present invention to provide a trailer with a dumping mechanism that is simple to construct and relatively inexpensive.

The trailer of the present invention is comprised of a trailer frame formed of hollow members adapted to receive and store compressed air. Wheels are rotatably attached to the bottom of the trailer frame. A tongue extends from the front end of the trailer end for hitching the trailer to a towing vehicle.

The rear end of a trailer bed is rotatably mounted to the rear end of the trailer frame. A trailer lifting mechanism for raising the front end of the trailer bed is comprised of an inflatable air bag assembly attached at its lower end to the trailer frame and at its upper end to the bottom of the trailer bed.

An air compressor is mounted on the axle of the trailer wheels adjacent one of the wheels. The air compressor is operated by rotation of the adjacent wheel and pumps air into the hollow frame members until a maximum air pressure is achieved. Air from the hollow frame members can be communicated to the air bag assembly for inflation thereof by means of a two way valve. Air can be released from the air bag by means of the two way valve.

The trailer bed is connected to the trailer frame in a manner such that the rear end of the floor of the bed is higher than the front end of the floor, thereby preventing material from inadvertently spilling from the trailer during transport and alleviating the need for a tailgate.

DESCRIPTION OF PREFERRED EMBODIMENTS

Figure 1:
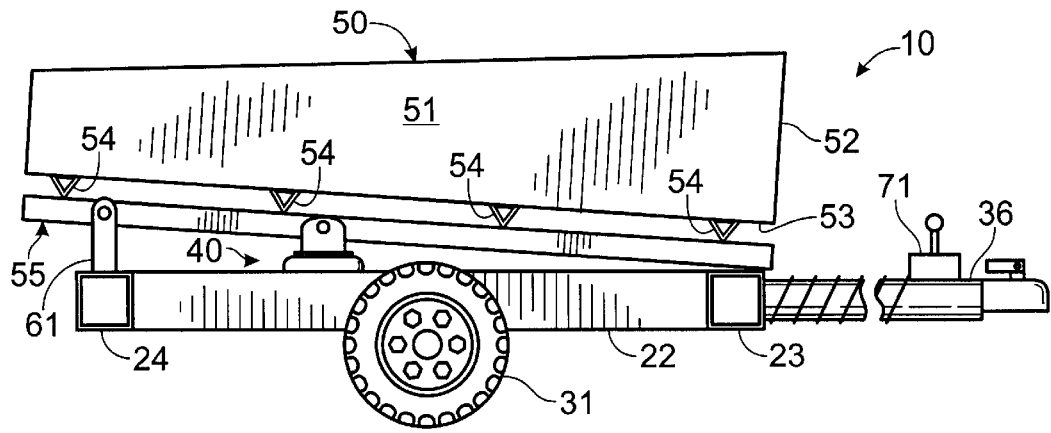
FIG. 1 is a side view of the dump trailer of the present invention with the bed shown in the down (retracted) position.

Dump trailer 10 of the present invention has a chassis frame 20 comprised of two longitudinal frame members 21 and 22, a front cross frame member 23 and a rear cross frame member 24. Frame members 21–24 are formed of tubular steel, preferably rectangular in cross-section. The frame members 21–24 are welded together in an air tight manner at their junctions, and appropriate openings (not shown) are drilled through the walls of front and rear frame members 23 and 24 in order to communicate the interiors of longitudinal frame members 21 and 22 with the interiors of front and rear frame members 23 and 24. The open ends of front and rear cross frame members 23 and 24 are capped in an air tight manner. Thus, the interiors of frame members 21–24 form an air tight chamber or reservoir for receiving and storing air under pressure, as will be described more fully below.

Cross member 25 is attached to the bottoms of longitudinal frame members 21 and 22, such as by a suspension system (not shown) or welding, and support upwardly extending stub shaft mounts 26 and 27 adjacent each end of cross member 25. Cylindrical stub shafts 28 and 29 extend outwardly from stub shaft mounts 26 and 27, respectively, and form the axles for wheels 30 and 31, respectively.

Cross member 35 is attached to the bottoms of longitudinal frame members 21 and 22, such as by welding, and the bottom of air bag assembly 40 is attached thereto in any suitable manner, such as by use of nuts and bolts.

A tongue 36 extends from the front cross frame member 23 for attaching dump trailer 10 to a towing vehicle in a manner well known in the art.

A trailer bed 50 includes side walls 51 (only one of which is shown), a front wall 52 and a bottom 53.

Trailer bed 50 has a plurality of reinforcing members 54 attached to bottom 53, reinforcing members 54 extending across bottom 53 perpendicular to the longitudinal axis of trailer bed 50.

A keel 55 extends longitudinally along the bottom 53 of bed 50, substantially at the longitudinal center line thereof, and is attached to the bottoms of reinforcing members 54 such as by welding. Keel 55 has an inverted "U" cross section and is formed of steel channel stock. The base 56 of keel 55 is attached to the bottoms of reinforcing members 54 with parallel legs 57 and 58 extending downwardly from both longitudinal edges of base 56.

Figure 4:
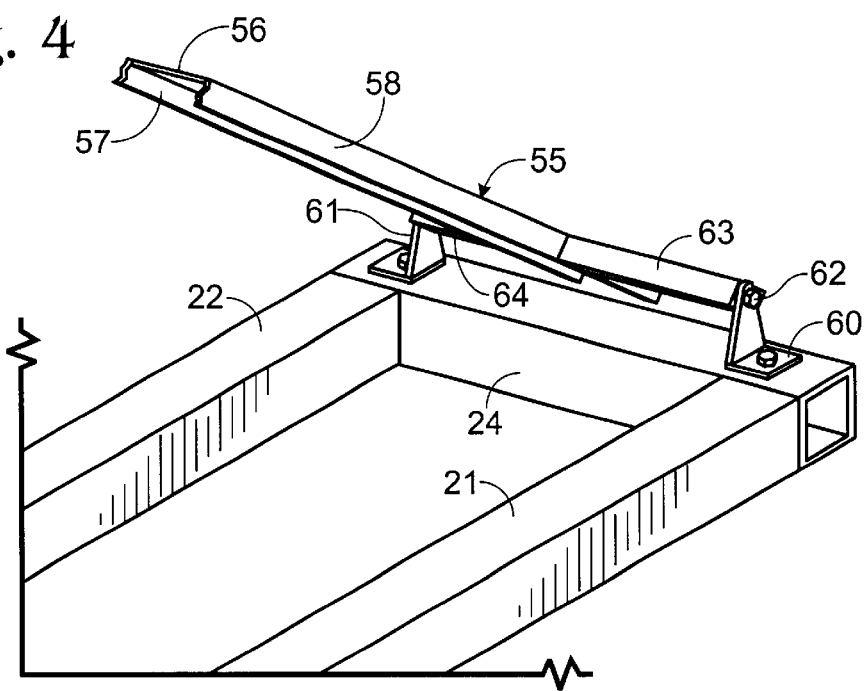
FIG. 4 is a partial perspective view showing the pivotal attachment of the rear of the trailer bed keel to the trailer frame.

As best seen in FIG. 4, the keel 55 of trailer bed 50 is pivotally attached to the rear cross frame member 24 by means of brackets 60 and 61 attached to rear cross frame member 24, such as by welding. A pivot rod 62 passes through openings in brackets 60 and 61 and openings in legs 57 and 58 of keel 55. Reinforcing rod covers 63 and 64 are welded to legs 57 and 58 of keel 55. Pivot rod 62 may be, essentially, a large bolt threaded at one end which is held in place by a nut screwed onto the threaded end.

Figure 5:
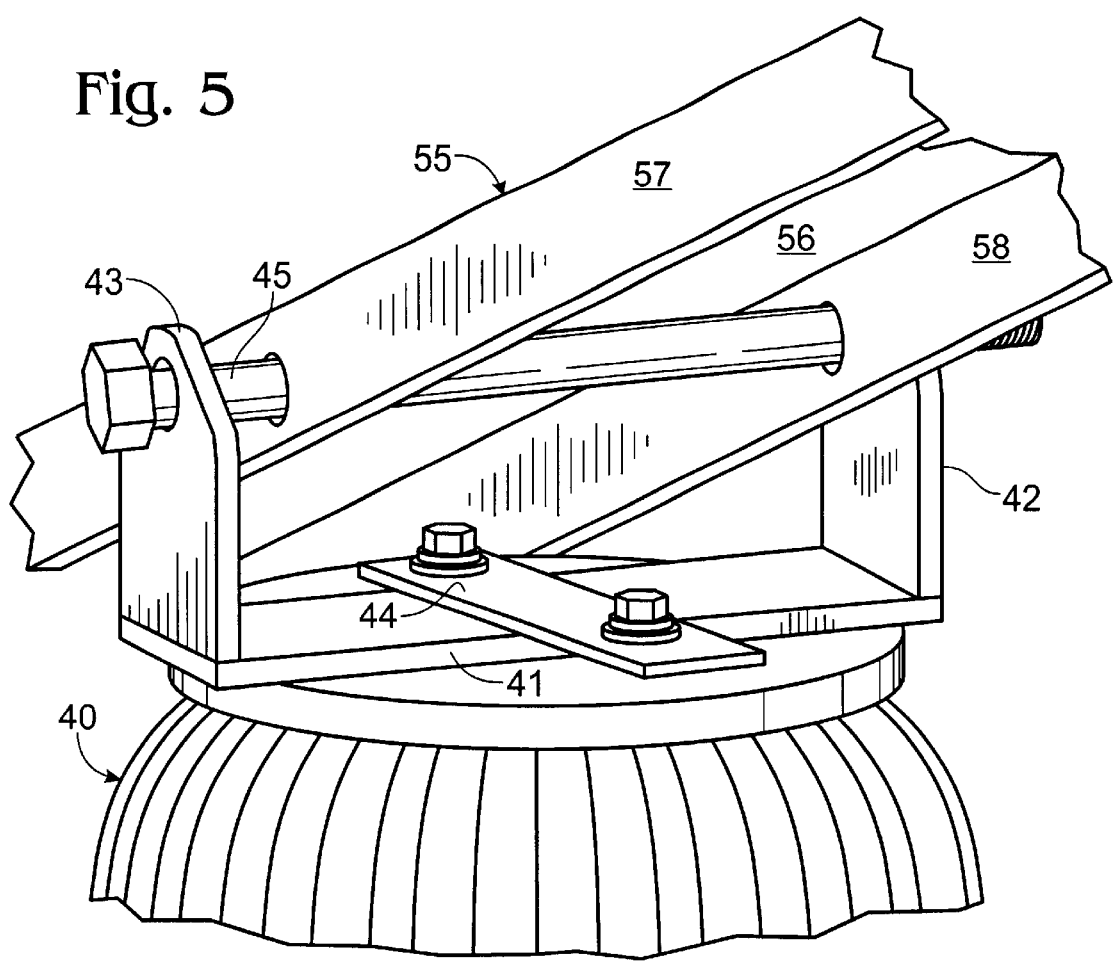
FIG. 5 is a partial perspective view showing the attachment of the upper end of the air bag to the keel of the trailer bed.

The top of air bag assembly 40 is pivotally attached to keel 55 as best seen in FIG. 5. A U-shaped mounting bracket having a base 41 and upwardly extending ears 42 and 43 is attached to the top of air bag assembly by attachment bar 44. An air bag pivot rod 45 extends through aligned openings in ears 42 and 43 and in legs 57 and 58 of keel 55. Pivot rod 45 may be, essentially, a large bolt threaded at one end which is held in place by a nut screwed onto the threaded end.

Air bag assembly 40 is commercially available in various sizes, the size being determined by the capacity required for the size of the dump trailer. A satisfactory size for many uses is one rated at 13,000 pounds. Such commercially available air bag assemblies are typically used for air suspension units for motor vehicles.

As mentioned earlier, frame members 21–24 act as a reservoir for compressed air which is used for actuating air bag assembly 40. Compressed air line 70 is connected at one end to one of the frame members 21–24, shown in FIG. 3 as being attached to frame member 22, and at its other end to one port of a two way air valve 71. Compressed air line 72 is connected at one end to the other port of two way air valve 71 and at its other end to air bag assembly 40.

Figure 2:
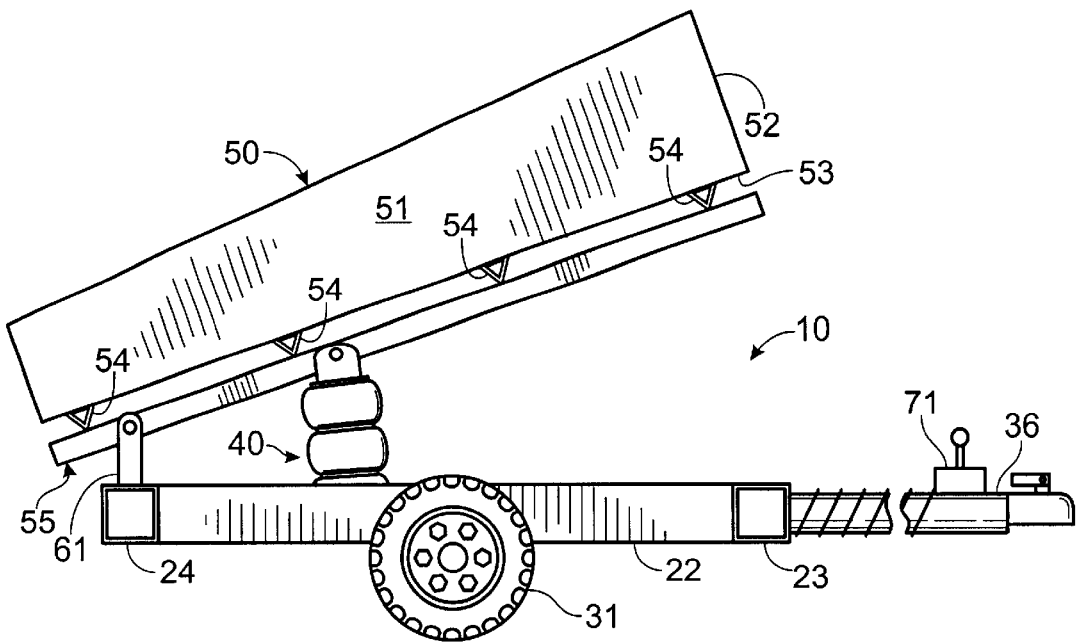
FIG. 2 is a side view of the dump trailer of the present invention with the bed shown in the up (extended) position.

When two way air valve communicates the compressed air contained in frame members 21–24 to air bag assembly 40 it is inflated and causes bed 50 to raise from its reclining position shown in FIG. 1 to its raised position shown in FIG. 2. When two way air valve communicates the compressed air contained in air bag assembly 40 with the atmosphere, air is exhausted from air bag assembly 40 and causes bed 50 to retract from its raised position shown in FIG. 2 to its reclining position shown in FIG. 1.

Figure 3:
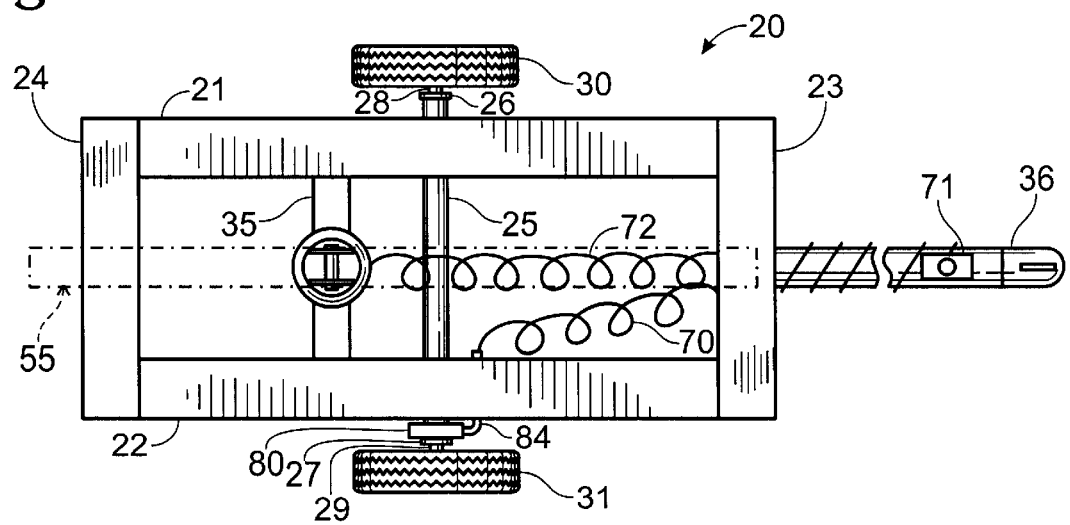
FIG. 3 is a top view of the frame of the dump trailer of the present invention.
Figure 6:
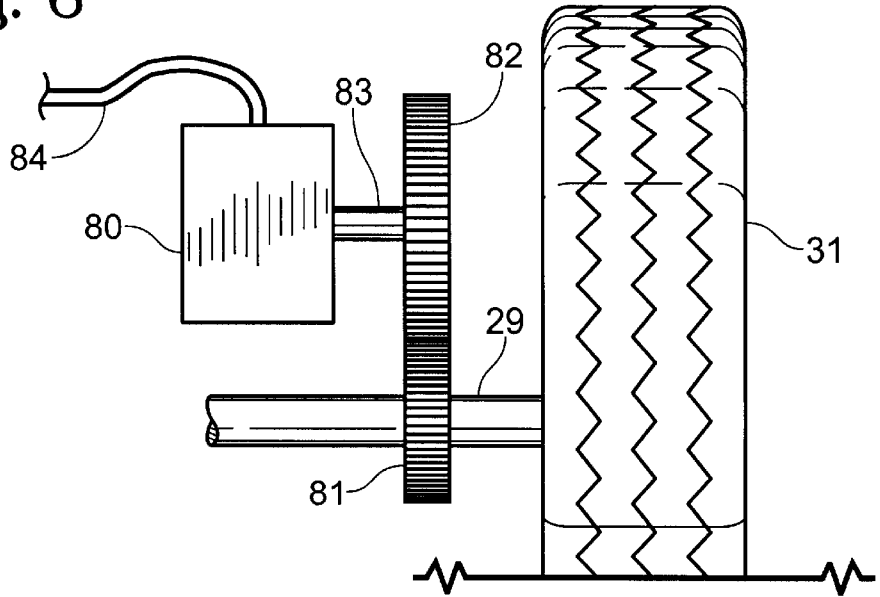
FIG. 6 is a rear view of the air compressor and wheel subassembly.

Compressed air may be introduced into frame members 21–24 from an externally located compressed air source, from an externally located compressor, etc. The preferred way of introducing compressed air into frame members 21–24 is by means of an air compressor 80 that is integral with trailer 10. As seen in FIGS. 3 and 6, air compressor 80 is located adjacent wheel 31, although it could be located adjacent wheel 30. Suitable sprocket means 81 on wheel 31 meshes with sprocket means 82 on the drive shaft 83 of air compressor 80 to cause compressed air to be introduced into frame members 21–24 via compressed air line 84 when wheel 31 is in motion.

It is desirable to include a safety valve which will vent compressed air from frame members 21–24 when the air pressure exceeds a safe level, such as about 65 psi.

As best seen in FIG. 1, during use of trailer 10 for hauling material the floor 53 of bed 50 is angled downward from the rear of bed 50 to the front 52 which reduces or eliminates material from spilling out the rear end, which is preferably left open i.e., has no tailgate.

If desired, trailer 10 can have a wheel suspension system, such as leaf springs, attached to longitudinal frame members 21 and 22 and cross member 25 in a manner well known in the art.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A dump trailer comprising:

a hollow chassis frame adapted to serve as a reservoir for compressed air;

a bed pivotally attached to said chassis frame;

an air bag assembly attached at one end to said chassis frame and at its other end to said bed, said air bag assembly being adapted to raise the front end of said bed when inflated and to lower the front end of said bed when deflated;

a first conduit for communicating said hollow chassis frame with a valve, a second conduit for communicating said valve with said air bag assembly, said valve being adapted in a first configuration to inflate said air bag assembly with compressed air contained in said hollow chassis frame and adapted in a second configuration to deflate said air bag assembly.

2. The trailer of claim 1 wherein said hollow chassis frame includes two substantially parallel and substantially coextensive longitudinal hollow frame members having front and rear ends, a hollow front cross frame member extending between said longitudinal frame members adjacent said front ends and a hollow rear cross frame member extending between said longitudinal frame members adjacent said rear ends.

3. The trailer of claim 1 wherein said bed includes a pair of substantially parallel side walls, a front wall extending between said side walls, a bottom, and a keel attached to said bottom.

* * * * *